(12) United States Patent
Chirayil et al.

(10) Patent No.: US 12,049,322 B2
(45) Date of Patent: Jul. 30, 2024

(54) HINGE

(71) Applicant: ZIM AIRCRAFT SEATING GMBH, Immenstaad am Bodensee (DE)

(72) Inventors: Abhilash Dominic Chirayil, Friedrichshafen (DE); Alexander Jensen, Friedrichshafen (DE)

(73) Assignee: Zim Aircraft Seating GmbH, Immenstaad am Bodensee (DE)

(*) Notice: Subject to any disclaimer, the term of this patent is extended or adjusted under 35 U.S.C. 154(b) by 113 days.

(21) Appl. No.: 17/822,444

(22) Filed: Aug. 26, 2022

(65) Prior Publication Data
US 2022/0402616 A1 Dec. 22, 2022

Related U.S. Application Data

(63) Continuation of application No. PCT/EP2021/055125, filed on Mar. 2, 2021.

(30) Foreign Application Priority Data
Mar. 5, 2020 (DE) ............ 10 2020 106 034.3

(51) Int. Cl.
*B64D 11/06* (2006.01)
(52) U.S. Cl.
CPC .............. *B64D 11/0644* (2014.12)
(58) Field of Classification Search
CPC ................................. B64D 11/0644
See application file for complete search history.

(56) References Cited

U.S. PATENT DOCUMENTS

| 1,500,524 | A | 7/1924 | Phillips | |
|---|---|---|---|---|
| 2014/0217798 | A1 | 8/2014 | Negusse | |
| 2014/0252821 | A1* | 9/2014 | Friedlander | B60N 3/002 297/232 |
| 2015/0084393 | A1* | 3/2015 | Chang | A47C 7/546 297/411.23 |

(Continued)

FOREIGN PATENT DOCUMENTS

| DE | 10 2009 060 841 A1 | 6/2011 |
|---|---|---|
| DE | 10 2014 119 600 A1 | 6/2016 |

(Continued)

OTHER PUBLICATIONS

International Search Report and Written Opinion (Application No. PCT/EP2021/055125) dated Jun. 28, 2021 (with English translation).

*Primary Examiner* — Anthony D Barfield
(74) *Attorney, Agent, or Firm* — BURR PATENT LAW, PLLC

(57) ABSTRACT

A hinge having a center element, a first leaf element articulated on the center element and rotatable about a first axis, and a second leaf element articulated on the center element and rotatable about a second axis. The leaf elements have mounting elements for a leaf. The hinge has a mounting member to fasten the center element to an air passenger seat. In the mounted state of the hinge on the air passenger seat and in the arranged state of the leaves, the leaves are present such that they can be moved relative to the remaining air passenger seat. The first and the second axes are present on the hinge so as to extend in a bearing plane and so as to be spaced apart from one another.

12 Claims, 8 Drawing Sheets

(56) References Cited

U.S. PATENT DOCUMENTS

2017/0101188 A1    4/2017   Augé et al.
2018/0281966 A1   10/2018   Chuang et al.

FOREIGN PATENT DOCUMENTS

| FR | 2 979 372 A1 | 3/2013 |
| GB | 2 458 819 A | 10/2009 |
| KR | 10-1601522 B1 | 3/2016 |
| WO | 2017/175139 A1 | 10/2017 |

* cited by examiner

HINGE

CROSS REFERENCE TO RELATED APPLICATIONS

This application is a continuation of International Application No. PCT/EP2021/055125 filed Mar. 2, 2021, which designated the United States, and claims the benefit under 35 USC § 119(a)-(d) of German Application No. 10 2020 106 034.3 filed Mar. 5, 2020, the entireties of which are incorporated herein by reference.

FIELD OF THE INVENTION

The present invention relates to a hinge.

BACKGROUND OF THE INVENTION

Various embodiments and various applications of hinges are known. One of the most well-known embodiments for a hinge is the door hinge. The door hinge connects a movable door or flap to a stationary door frame, the door being mounted on the door frame movably by means of the hinge.

Moreover, what is known as a double hinge is known, in the case of which two doors or flaps which are present separately from one another can be connected to a stationary element, for example, a frame, such that they can be moved separately in each case.

SUMMARY OF THE INVENTION

The present invention is based on the object of providing an improved hinge, in particular, an improved double hinge; advantageously of providing a double hinge which has an improved mounting situation.

The present invention proceeds from a hinge, the hinge having a center element and two leaf elements, a first leaf element being articulated on the center element such that it can be rotated about a first rotational axis, a second leaf element being articulated on the center element such that it can be rotated about a second rotational axis, the first leaf element having a mounting element, in order to arrange a leaf or a flap, the second leaf element having a further mounting element, in order to arrange a further leaf or a further flap, the hinge having a mounting member, in order to fasten the center element to an air passenger seat, with the result that, in the mounted state of the hinge on the air passenger seat and in the arranged state of the leaves or the flaps, the leaves or the flaps are present such that they can be moved relative to the remaining air passenger seat, the first and the second rotational axis being present on the hinge so as to extend in a bearing plane and so as to be spaced apart from one another.

The hinge is preferably present as a double hinge. For example, the hinge is configured as a fitting, for example, as a table hinge, in particular, as an aircraft table hinge. The hinge is advantageously present in a manner which is made from metal or plastic or a combination of the materials.

The center element is advantageously present in a manner which is rotationally movable with respect to the first and with respect to the second leaf element. For example, the first and the second leaf element are present in a manner which is rotationally movable relative to the center element independently of one another. The first and the second rotational axis advantageously extend in an identical direction. For example, the first and the second rotational axis extend parallel to one another. For example, the first and the second rotational axis extend in an identical bearing plane. It is conceivable that the first rotational axis is configured in the region of a first side of the center element, and the second rotational axis is present in a region of a second side of the center element, the first and the second side of the center element being present so as to lie opposite one another and so as to be spaced apart from one another. For example, the center element is present as a panel, and the first side of the center element is the first narrow side of the panel and the second side of the center element is a further narrow side of the panel. The first rotational axis advantageously extends along a longitudinal extent of the first side of the center element, and the second rotational axis extends along the longitudinal extent of the second side of the center element.

For example, the center element, the first leaf element and/or the second leaf element are configured in the manner of small panels, for example, are present as a small panel or a panel.

The mounting element is preferably configured as a bore, as a hole, as a pin, as a bolt, as an adhesive element, for example, as an adhesive, and/or as a clip. For example, the leaf or the flap can be mounted releasably on a leaf element of the hinge. It is also conceivable, however, that a leaf or a flap can be connected non-releasably to one of the leaf elements of the hinge. For example, the leaf elements are configured in such a way that a leaf or a flap can be clamped, screwed, adhesively bonded and/or clipped to a leaf element.

The leaf or the flap is advantageously present in the manner of a panel, in particular, is configured as a panel. It is conceivable that the leaf or the flap is configured as a support, for supporting an arm of a user, for example, for supporting an arm of the user of an air passenger seat. For example, the leaf or the flap is present as an arm support, for example, as an armrest support. For example, the leaf or the flap is configured in two pieces. It is conceivable that the leaf or the flap is configured in such a way that, in the mounted state of the leaf or the flap on one of the leaf elements, the leaf or the flap encloses the leaf element on five sides.

The core concept of the present invention is to be seen in the fact that the first leaf element is articulated on the center element by way of a first bushing, the first bushing of the first leaf element being present along the first rotational axis between a second and a third bushing of the center element, the first to third bushing being mounted on a first shaft of the hinge, the second leaf element being articulated on the center element by way of a fourth bushing, the fourth bushing of the first leaf element being present along the second rotational axis between a fifth and a sixth bushing of the center element, the fourth to sixth bushing being mounted on a second shaft of the hinge. As a result, the hinge is of comparatively stable configuration.

The first rotational axis is preferably present as an axis of rotation of the first shaft. For example, the second rotational axis is configured as an axis of rotation of the second shaft.

The first, the second and the third bushing are advantageously mounted rotatably on the first shaft of the hinge. For example, the first, the second and/or the third bushing are present such that they can be moved relative to the first shaft. It is also conceivable that the second and the third bushing are connected to the shaft in a positionally fixed manner. For example, the first bushing is connected to the shaft in a positionally fixed manner. The second and the third bushing are advantageously present on the center element in a positionally fixed manner, with the result that the second and the third bushing are present such that they can be moved relative to the first bushing together, in particular, at the same time. For example, the second and the third bushing are connected to the center element in a positionally fixed manner.

The fourth, the fifth and the sixth bushing are advantageously mounted rotatably on the second shaft of the hinge. For example, the fourth, the fifth and/or the sixth bushing are present such that they can be moved relative to the second shaft. It is also conceivable that the fifth and the sixth bushing are connected to the shaft in a positionally fixed manner. For example, the fourth bushing is connected to the shaft in a positionally fixed manner. The fifth and the sixth bushing are advantageously present on the center element in a positionally fixed manner, with the result that the fifth and the sixth bushing are present such that they can be moved relative to the fourth bushing together, in particular, at the same time. For example, the fifth and the sixth bushing are connected to the center element in a positionally fixed manner. For example, the first bushing is configured on the first leaf element in a positionally fixed manner, for example, is connected to the first leaf element in a positionally fixed manner. For example, the fourth bushing is present on the second leaf element in a positionally fixed manner, for example, is connected to the second leaf element in a positionally fixed manner.

It is conceivable that the center element and the second bushing and the third bushing are configured in one piece. It is also conceivable that the center element and the fifth bushing on the sixth bushing are configured in one piece. For example, the first bushing is present in one piece on the first leaf element and/or the fourth bushing is present in one piece with the second leaf element.

The first bushing, the second bushing and/or the third bushing preferably enclose or engage around the first shaft completely, in particular, circumferentially around the rotational axis of the first shaft. The fourth bushing, the fifth bushing and/or the sixth bushing advantageously enclose or engage around the second shaft completely, in particular, circumferentially around the rotational axis of the second shaft.

The first bushing, the second bushing and the third bushing advantageously form a first rotary joint together with the first shaft. For example, the fourth bushing, the fifth bushing and the sixth bushing form a second rotary joint together with the second shaft. For example, the hinge comprises precisely two rotary joints.

It also proves to be advantageous that the hinge has a connecting member which is present so as to extend in a main extent direction transversely with respect to the bearing plane of the rotational axes, the center element being arranged at a first end of the connecting member, the mounting member being present at a second end of the connecting member. The first and the second end of the connecting member are advantageously present in a manner which is spaced apart from and lies opposite the first and the second end of the connecting member.

The mounting member and the connecting member are preferably configured in one piece. The mounting member, the connecting member and the center element are advantageously configured in one piece. For example, the connecting member connects the center element and the mounting member to one another. For example, the connecting member is of panel-like configuration, for example, is configured as a panel. The connecting member advantageously extends with a length along a longitudinal extent of the center element. For example, the rotational axes extend in the direction of, in particular, parallel to, the longitudinal extent of the center element. For example, the connecting member is arranged between the second and/or the third bushing and the fifth and/or the sixth bushing on the center element in a direction transversely with respect to the longitudinal extent of the center element.

The connecting member advantageously comprises a recess, in particular, a single recess. For example, the recess is present on the connecting member as a depression on a first side of the connecting member. For example, the depression extends in a first direction in a region between the center element and the mounting member, and in a second direction in the direction of the longitudinal extent of the center element and/or in the direction of the extent of the rotational axis, the first direction and the second direction being present in a manner which is oriented transversely with respect to one another. As a result, a weight of the hinge is reduced, stability of the hinge advantageously being maintained comparatively. It is also conceivable that the connecting member has two recesses, a first recess being configured on a first side of the connecting member and a second recess being configured on a second side of the connecting member, the first and the second side of the connecting member being present such that they lie opposite one another and are spaced apart.

It also proves to be advantageous the mounting member extends in a plane transversely with respect to the main extent plane of the connecting member, with the result that the mounting member and the connecting member are present in a T-shaped manner. The center element, the connecting member and the mounting member are advantageously of I-shaped configuration. It is conceivable, moreover, that the center element, the connecting member and the mounting member are configured and arranged with respect to one another in such a way that the three elements together have at least one plane of symmetry, in particular, precisely one plane of symmetry.

The mounting member preferably comprises a bore, for example, a through bore, a hole, for example, a through hole, a pin, a bolt, an adhesive element, for example, an adhesive, and/or a clip, in order to fasten the hinge to the air passenger seat, for example, to a center rest of an air passenger seat. For example, the hinge can be mounted releasably on the air passenger seat, for example, on the center rest of the air passenger seat. It is also conceivable, however, that the hinge can be connected non-releasably to the air passenger seat, for example, to the center rest of the air passenger seat. For example, the mounting member is configured in such a way that the hinge is clamped, screwed, adhesively bonded and/or clipped to the air passenger seat, for example, to the center rest of the air passenger seat.

It likewise proves to be advantageous that the center element has a first and a second stop member, the first leaf element bearing against the first stop member and the second leaf element bearing against the second stop member in a first position of the leaf elements. As a result, the stop members limit a movement of the leaf elements relative to the center element in the first position.

For example, a leaf element comprises a contact member, for example, two contact members. The first leaf element advantageously bears and/or lies by way of one contact member, in particular, by way of the two contact members, against the first stop member of the center element in the first position of the first leaf element. For example, the second leaf element bears and/or lies by way of one contact member, in particular, by way of the two contact members, against the second stop member of the center element in the first position of the second leaf element.

A stop member and/or contact member are/is advantageously configured as a stop face and/or as a contact face. For example, a stop member extends, as viewed in the direction of an extent of the rotational axis, between the second and the third bushing. The contact member advantageously limits an extent of the first bushing in the direction of an extent of the rotational axis.

It is also advantageous that the center element has a first and a second stop element, the first leaf element bearing against the first stop element and the second leaf element bearing against the second stop element in a second position of the leaf elements. As a result, the stop elements limit a movement of the leaf elements relative to the center element in the second position.

For example, a leaf element comprises a contact element, for example, two contact elements. The first leaf element advantageously bears and/or lies by way of one contact element, in particular, the first leaf element bears and/or lies by way of the two contact elements, against the first stop element of the center element in the second position of the first leaf element. For example, the second leaf element bears and/or lies by way of one contact element, in particular, the second leaf element bears and/or lies by way of the two contact elements, against that the second stop element of the center element in the second position of the second leaf element.

A stop element and/or contact element are/is advantageously configured as a stop face and/or as a contact face. A stop element extends, for example, as viewed in the direction of an extent of a rotational axis, between the second and the third bushing. The contact element advantageously limits an extent of the first bushing in the direction of an extent of the rotational axis.

The first leaf element and/or the second leaf element are/is advantageously present in a manner which can be rotated between the first and the second position by less than 180° about the first and the second rotational axis, respectively. The first and/or the second leaf element are/is preferably present in a manner which can be rotated between the first stop member and the first stop element in an angular range of less than 180° about the first rotational axis. For example, the first and/or the second leaf element are/is present in a manner which can be rotated between the first and the second position in an angular range of precisely 90° about the first and the second rotational axis, respectively. The first and/or the second leaf element are/is preferably present in a manner which can be rotated between the first stop member and the first of element by an angle of precisely 90° about the first and the second rotational axis, respectively.

The first leaf element is advantageously present in a manner which can be rotated between the first and the second position in an angular range between 0° and 210°. For example, the first leaf element is present in a manner which can be rotated between the first and the second position in an angular range between 0° and 190°, between 0° and 180°, between 0° and 175°, between 0° and 170° or between 0° and 160°. The second leaf element is advantageously present in a manner which can be rotated between the first and the second position in an angular range between 0° and 210°. For example, the second leaf element is present in a manner which can be rotated between the first and the second position in an angular range between 0° and 190°, between 0° and 180°, between 0° and 175°, between 0° and 170° or between 0° and 160°.

For example, the first and the second leaf element enclose an angle of 0° in the second position. The first and the second leaf element advantageously enclose an angular range between 0° and 30°, an angular range between 0° and 25°, an angular range between 0° and 20°, an angular range between 0° and 15°, an angular range between 0° and 10° or an angular range between 0° and 5° in the second position. A main plane of extent of the first leaf element and a main plane of extent of the second leaf element advantageously enclose the angle.

One advantageous embodiment of the present invention is a center rest of an air passenger seat row with a hinge in accordance with one of the abovementioned variants and with an arm support, the arm support being articulated movably on the hinge. The arm support is advantageously present in a movable manner on the center rest. The arm support is preferably present in a manner which is mounted movably by means of the hinge. For example, the arm support can be connected to a leaf element of the hinge in a positionally fixed manner. The center rest preferably comprises, in particular, precisely two hinges. It is conceivable that the hinges are arranged spaced apart from one another on the center rest.

An arm support is preferably configured in two pieces. An arm support comprises, for example, an arm support lower part and an arm support upper part. For example, the arm support upper part and the arm support lower part enclose a leaf element in the state in which they are arranged on the hinge. It is conceivable, furthermore, that the arm support is configured such that a padded element can be arranged on the arm support. For example, a padded element can be arranged on the arm support upper part. It is also conceivable that the arm support comprises the padded element.

In particular, precisely two arm supports are advantageously articulated movably on the hinge. A first arm support is advantageously fastened to the first leaf element and a second arm support is fastened to the second leaf element.

It is proposed, furthermore, that the center rest has a storage surface which extends in a storage plane, the hinge being arranged in the region of the storage surface via the mounting member on the center rest, the storage surface being present in a manner which is spaced apart from the bearing plane of the rotational axes. As a result, the center rest is present in such a way that storage space for utensils, for example, for a mobile telephone of a user of the air passenger seat, on which the center rest can be arranged, is produced. The storage plane and the depositing plane are advantageously present such that they are oriented parallel to one another. The center rest is advantageously configured in such a way that a clearance is present between the storage surface and an armrest in the first position and/or in the second position of the armrest, the clearance being configured in such a way that a mobile telephone and/or a pair of glasses can be arranged between the storage surface and the armrest.

It is advantageous, moreover, that the center rest has, in particular, precisely two storage surfaces which extend in the same storage plane and are present in a manner which is spaced apart from one another. The storage planes are advantageously present in a manner which is spaced apart by way of the hinge. It is conceivable that the center rest can be arranged on an air passenger seat row, for example, on an air passenger double seat, with the result that the center rest separates two air passenger seats from one another. For example, in the state in which it is arranged on the air car passenger seat, the center rest forms an arm support for a first and a second air passenger seat of the air passenger seat row. It is conceivable that a storage surface is present in each case on the center rest for a user of an air passenger seat of the air passenger seat row.

It is also advantageous that the connecting member of the hinge is present in a manner which projects from the storage plane. As a result, a support surface of the arm support is present spaced apart from the storage plane. For example, the connecting member of the hinge extends in a direction transversely with respect to the storage planes on the center rest.

It is likewise advantageous that the center rest has two arm supports, the center rest having two stop members, in each case one arm support bearing against in each case one stop member in a first position, each arm support having a support surface, the support surfaces extending in the direction of the bearing plane in the first position. Supporting of the arm support in the first position of the arm support is advantageously realized by way of the stop members of the center rest. For example, the stop member of the center rest is configured as a limiting member, the delimiting member limiting a movement of the arm support from the second position of the arm support into the first position of the arm support. For example, the delimiting member defines the first position of the arm support, for example, together with the stop member of the hinge. The arm supports advantageously extend in the storage plane in the first position.

The support surface of the arm support advantageously forms a plane for supporting an arm of a user of the seat as arm support or armrest. In the state in which it is arranged on the arm support, the padded element advantageously forms a support surface for an arm of the user.

It is also advantageous that the center rest has two arm supports, the two arm supports being present such that they can be moved in each case into a second position, the two arm supports being present so as to bear against one another in the respective second position. For example, the arm supports bear against one another by way of their padded elements, in particular, by way of the support surfaces, in the second position. It is also conceivable that the arm supports, in particular, the support surfaces, are present spaced apart from one another in the second position. For example, the support surfaces of the arm supports extend in an identical direction in the second position, for example, the support surfaces of the arm support are present in a manner which is oriented in parallel with one another in the second position. For example, a support plane of one of the support surfaces extends in the second position of the arm support transversely with respect to the storage plane of the hinge and/or transversely with respect to the storage plane of the storage surface of the center rest.

One advantageous modification of the invention is an air passenger seat, in particular, an air passenger double seat, with a hinge in accordance with one of the abovementioned embodiment types or with a center rest in accordance with one of the abovementioned variants. For example, the air passenger seat is present as an air passenger seat row. It is conceivable that the air passenger seat row provides two or more seating options for users. It is conceivable that the air passenger seat row provides precisely two or precisely three seating options for users, for example, in the form of an air passenger double seat or in the form of an air passenger triple seat. The air passenger seat row preferably comprises two or more air passenger seats which are present, for example, such that they are connected to one another, in particular, are connected inseparably to one another. The center rest is advantageously present between two air passenger seats of an air passenger seat row and/or between two air passenger seats of the air passenger double seat. The center rest is preferably present as a dividing element, for example, as an armrest and/or as a divider, between two air passenger seats of an air passenger seat row and/or the air passenger double seat.

One possible embodiment of the present invention is an aircraft with an air passenger seat in accordance with one of the abovementioned variants or with a hinge in accordance with one of the abovementioned embodiment types.

BRIEF DESCRIPTION OF THE DRAWINGS

One exemplary embodiment will be explained in greater detail with the specification of further details and advantages on the basis of the following diagrammatic drawings, in which.

DETAILED DESCRIPTION OF THE INVENTION

Figure 1:
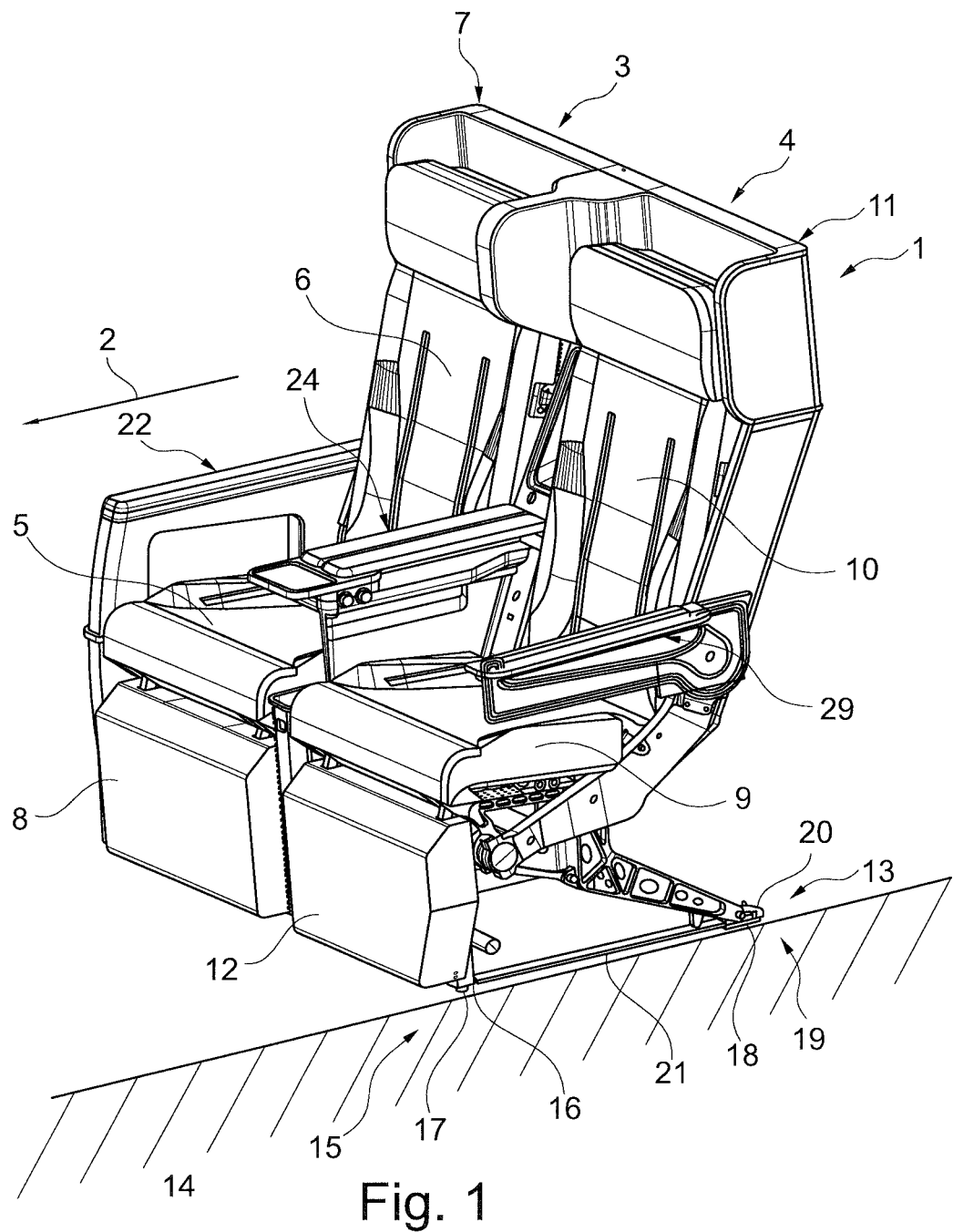
FIG. 1 shows a perspective view obliquely from the front of a seat row with two air passenger seats, in each case comprising a seat base, a backrest including rear-side enclosure, a center rest and a leg support.

FIG. 1 shows a seat row 1 with a seat direction 2 with two air passenger seats 3 and 4. In the following text, positional and directional specifications such as front, rear, top and bottom relate to the seat direction 2 and the use state of the seat row 1.

The two air passenger seats 3 and 4 are constructed correspondingly. The air passenger seat 3 has a seat base 5, a backrest 6 and an enclosure 7 on the rear side with respect to the backrest 6. A preferably foldable or pivotable leg support 8 which can be folded about a horizontal axis is present adjacently with respect to a front end region of the seat base 5.

Correspondingly, the air passenger seat 4 comprises a seat base 9, a backrest 10, an enclosure 11 and a leg support 12.

The seat bases 5, 9, the backrests 6, 10 and the leg supports 8, 12 comprise preferably ergonomically shaped padding.

For example, the air passenger seats 3 and 4 can be mounted via two support legs 13 (only one visible) on a cabin floor 14 of an aircraft cabin of an associated aircraft (not shown). For this purpose, the support leg 13 has, on a lower end region 15 of a front strut 16, a mounting point 17 and a further mounting point 18 on a lower end region 19 of a rear strut 20. A strut element 21 is provided between the end regions 15 and 19.

In addition, the seat row 1 preferably has an outer armrest 22 laterally on the air passenger seat 3 and an outer armrest 13 laterally on the air passenger seat 4. A center rest 24 which forms an arm support for an air passenger is present between the two air passenger seats 3 and 4, preferably at the height of the two outer armrests 22 and 23.

The respective associated backrest 6 and 10 is advantageously arranged in a shell shape of the respective enclosure 7 and 11, respectively. The backrest 6 and 10 is preferably guided movably in the enclosure 7 and 11, respectively, in order to set different tilting positions, for example, together with the associated displaceably mounted seat base 5 and 9, respectively.

Figure 2:
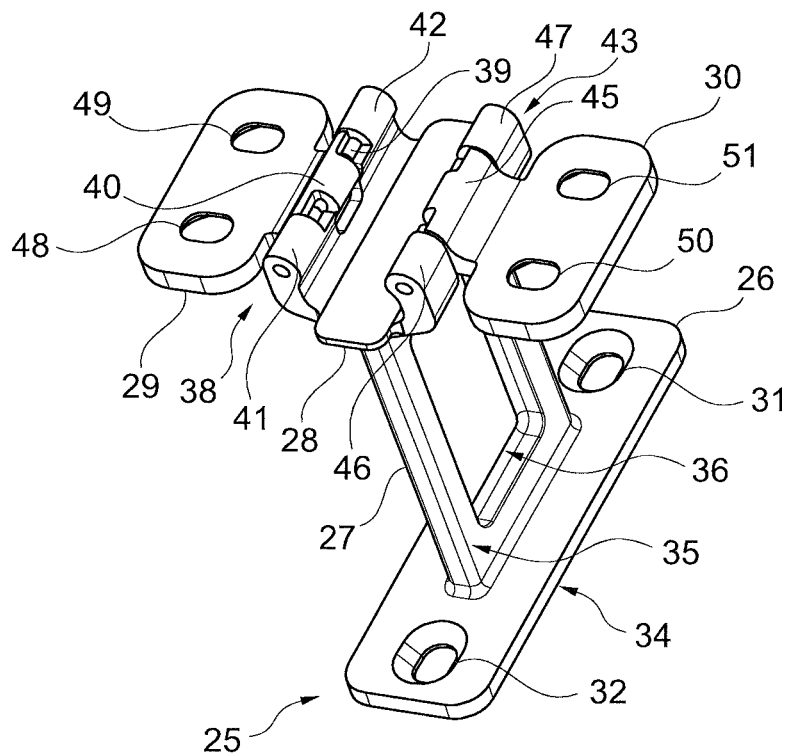
FIG. 2 shows a perspective view from the front, laterally from the right, at the top of a hinge according to the present invention with leaf elements of the hinge in a second position.

FIG. 2 shows a hinge 25 according to the present invention in a perspective view from obliquely laterally at the top. The hinge 25 comprises a mounting member 26, a connecting member 27, a center element 28, a first leaf element 29 and a second leaf element 30.

Figure 15:
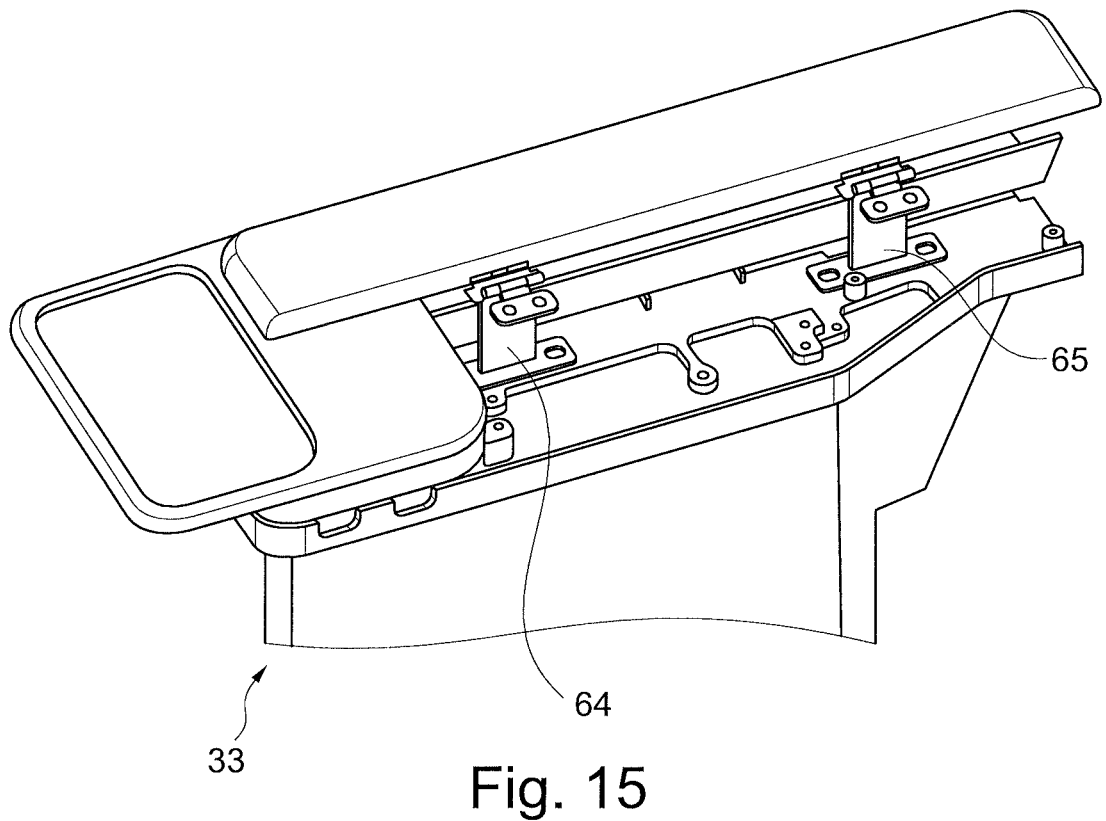
FIG. 15 shows a perspective partial view of the center rest according to FIG. 11, the armrest of the center rest and a panel element of the center rest which comprises a storage surface being held such that they cannot be seen.
Figure 16:
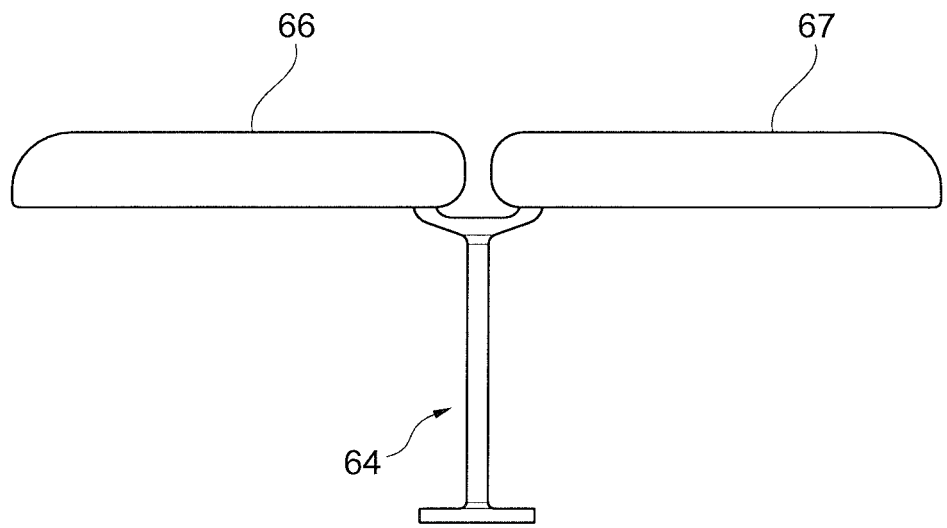
FIG. 16 shows a front view of a hinge with arranged armrests in a second position of the hinge.

The mounting member 26 is advantageously of plate-shaped configuration. For example, the mounting member 26 comprises a first and a second through bore 31, 32, in order to fasten the hinge 25 to a center rest 33 (see FIG. 15), for example, by means of screws (not shown). The mounting member 26 preferably comprises and extends along a fastening surface 34, by means of which the mounting member 26 can be mounted so as to bear against the center rest 33.

The connecting member 27 is advantageously likewise of plate-shaped configuration. For example, a main plane of extent of the connecting member 27 extends between the mounting member 26 and the center element 28. The main plane of extent of the connecting member 27 is preferably present transversely, in particular, perpendicularly with respect to the fastening face 34 of the mounting member 26. For example, the connecting member 27 comprises a recess 36 in a main side 35 of the connecting member 27. The connecting member 27 is preferably configured on a second main side 37 which lies opposite and are spaced apart from the main side 35, in particular, in a continuously flat manner.

The first leaf element 29 comprises two mounting elements 48, 49, in order to fasten an arm support thereto (see also FIGS. 11 to 16). The second leaf element 30 comprises two mounting elements 50, 51, in order to fasten a further arm support thereto (see also FIGS. 11 to 16).

The first leaf element 29 is connected to the center element 28 in a rotationally movable manner via a rotary joint 38. The rotary joint 38 comprises a shaft 39, a first bushing 40, a second bushing 41, and a third bushing 42. The first bushing 40 is advantageously present in one piece with the first leaf element 29. The second and the third bushing 41, 42 are preferably configured in one piece with the center element 28. The first, the second and the third bushing 40-42 are advantageously mounted rotatably on the shaft 39 and are connected to one another via the shaft 39.

Figure 4:
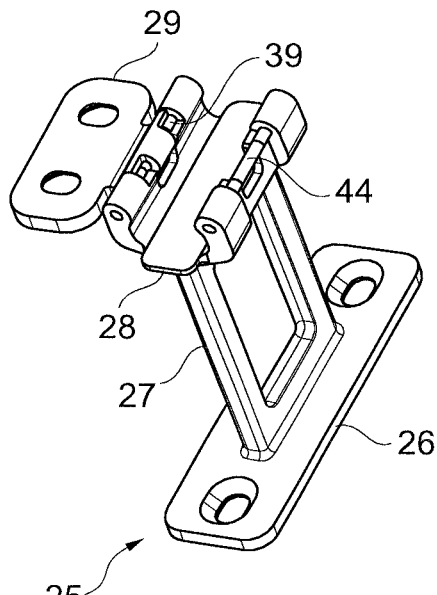
FIG. 4 shows the hinge according to FIG. 2, one leaf element of the hinge being held such that it cannot be seen.
Figure 5:
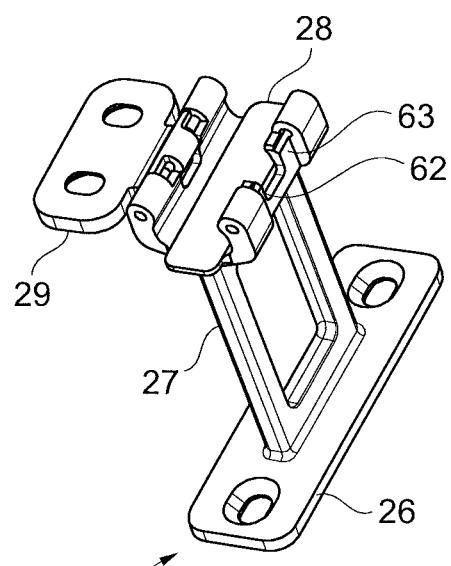
FIG. 5 shows the hinge according to FIG. 4, a shaft of the hinge being held such that it cannot be seen, in addition to the leaf element.
Figure 6:
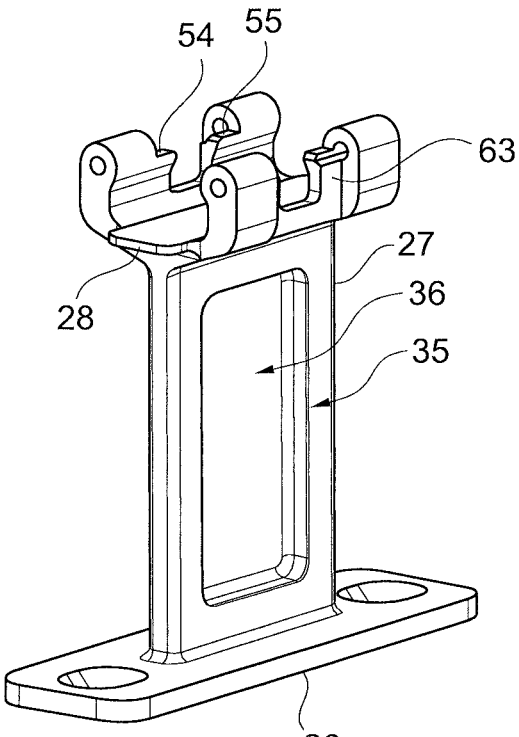
FIG. 6 shows a further perspective view of the hinge according to FIG. 2, the two leaf elements and the two shafts of the hinge being held such that they cannot be seen.
Figure 7:
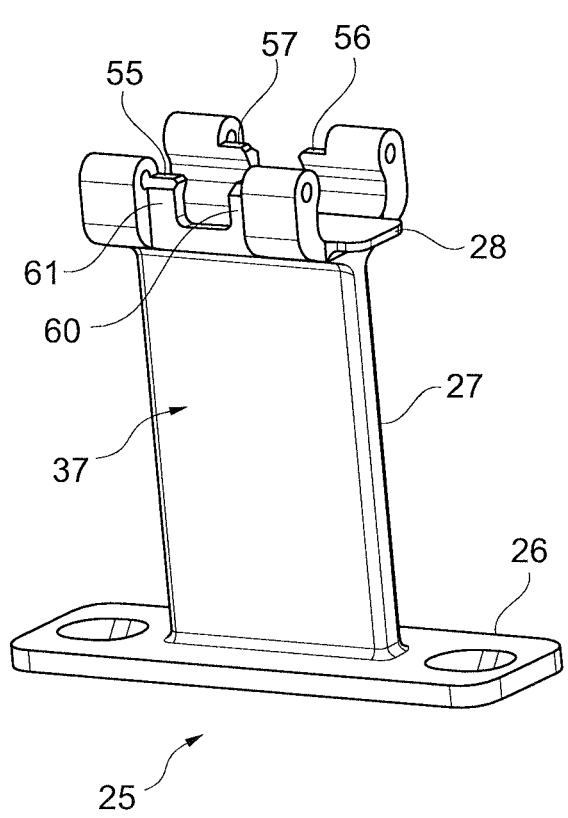
FIG. 7 shows a further perspective view from the front, laterally from the left, at the top of the hinge according to the embodiment of FIG. 6.
Figure 8:
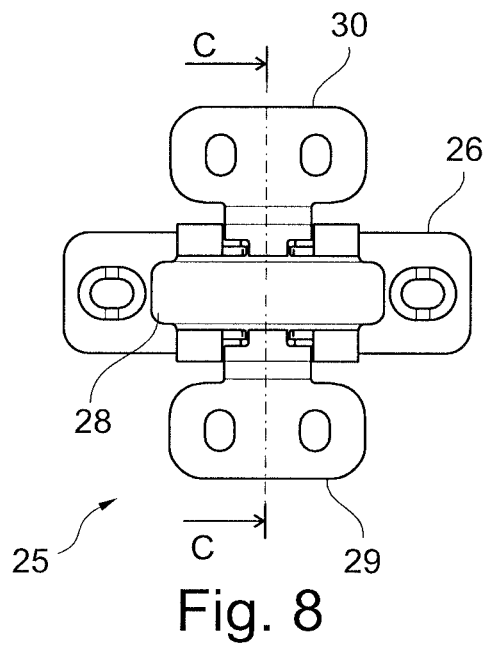
FIG. 8 shows a plan view of the hinge according to FIG. 2.
Figure 9:
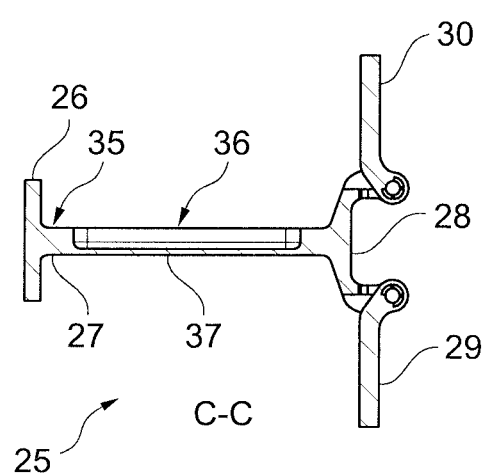
FIG. 9 shows a sectional view C-C through the hinge, in accordance with the section C-C illustrated in FIG. 8.

The second leaf element 30 is connected to the center element 28 in a rotationally movable manner via a rotary joint 43. The rotary joint 43 comprises a shaft 44 (see FIG. 4), a first bushing 45, a second bushing 46, and a third bushing 47. The first bushing 45 is advantageously present in one piece with the first leaf element 30. The second and the third bushing 46, 47 are preferably configured in one piece with the center element 28. The first, the second and the third bushing 45-47 are advantageously mounted rotatably on the shaft 44 and are connected to one another via the shaft 44.

Figure 3:
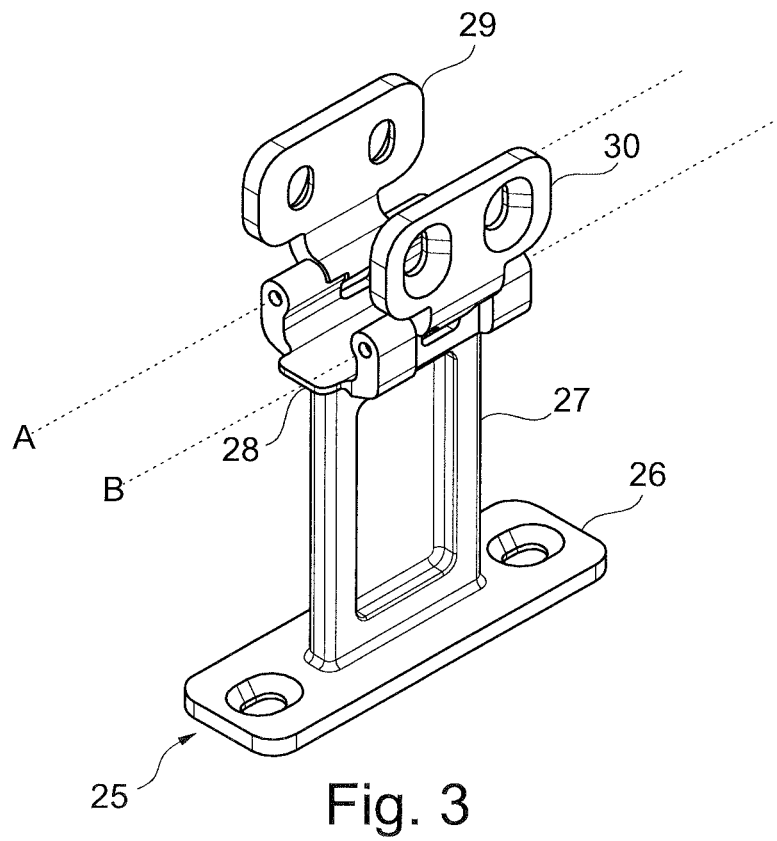
FIG. 3 shows a further perspective view from the front, laterally from the right, at the top of the hinge according to FIG. 2 with leaf elements of the hinge in a first position.

In FIG. 2, the first and the second leaf element 29, 30 are situated in a second position, the first and the second leaf element 29, 30 being mounted rotatably on the shafts 39, 44, with the result that they are present such that they can be pivoted about rotational axes A, B of the shafts 39, 40 into a second position according to FIG. 3. The rotational axes A, B advantageously lie in a bearing plane.

Figure 10:
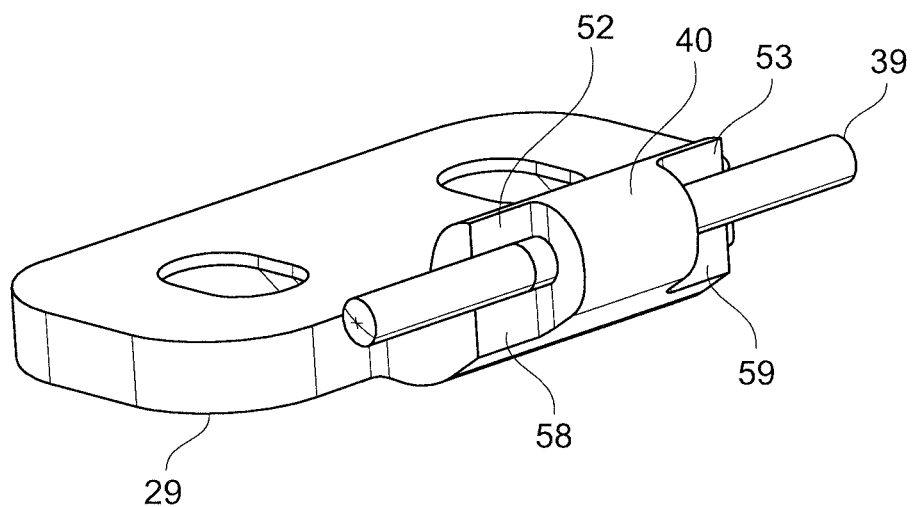
FIG. 10 shows a perspective view from obliquely laterally at the top of one leaf element of the hinge with an arranged shaft.

In the first position of the leaf elements 29, 30 according to FIG. 3, the leaf elements 29, 30 bear by way of contact members 52, 53 (shown by way of example for the first leaf element 29 in FIG. 10), against stop members 54-57 of the center element 28, in particular, directly. As a result, the stop members 54-57 of the center element 28 limit a movement of the leaf elements 29, 30 in a first rotational direction. In the second position of the leaf elements 29, 30 according to FIG. 2, the leaf elements 29, 30 by way of contact elements 58, 59 (shown by way of example for the first leaf element 29 in FIG. 10) against stop elements 60, 63 of the center element 28, in particular, directly. As a result, the stop elements 60, 63 of the center element 28 limit a movement of the leaf elements 29, 30 in a second rotational direction.

Figure 11:
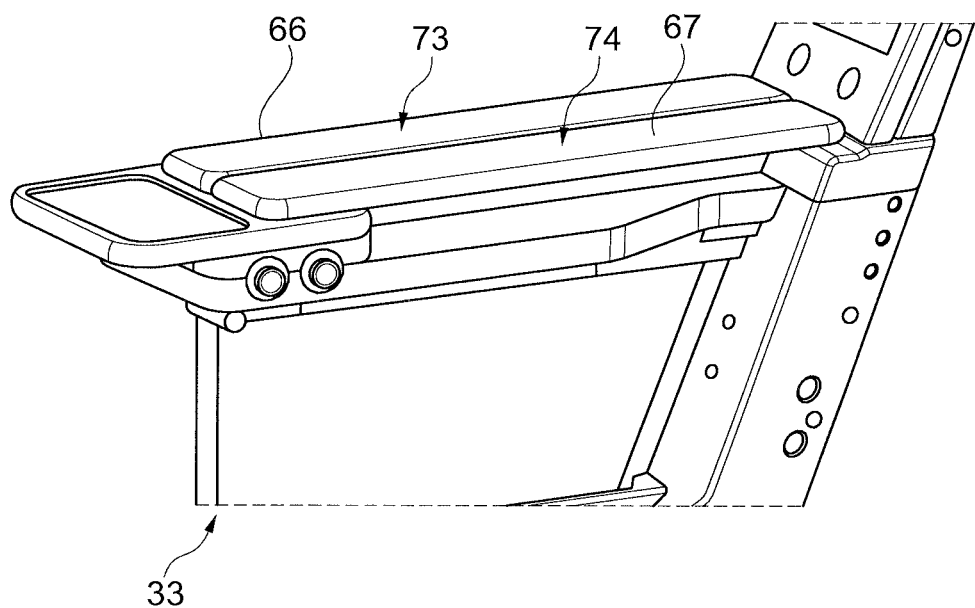
FIG. 11 shows a perspective partial view from obliquely laterally at the front of the center rest of the seat row according to FIG. 1.

FIG. 11 shows a perspective view of a part detail of a center rest 33. The center rest 33 according to FIG. 11 is present, for example, in an identical manner with respect to the center rest 24 according to FIG. 1. The center rest 33 comprises two hinges 64, 65 (see also FIGS. 13 to 15). The hinges 64, 65 are advantageously of identical configuration with respect to the hinge 25. Moreover, the center rest 33 comprises a first arm support 66 and a second arm support 67. The first arm support 66 is advantageously connected to first leaf elements of the hinges 64, 65. For example, the second arm support 67 is coupled to the second leaf elements 68, 69 of the hinges 64, 64.

Moreover, the center rest 33 comprises, for example, a panel element 70 which has a storage surface 71. The center rest 33 advantageously comprises two panel elements 70 with in each case one storage surface 71, 78. The storage surface 71 of the panel element 70 advantageously extends in a storage plane C, the storage plane being present, for example, spaced apart from and parallel to the bearing plane L of the hinges 64, 65 (see also FIG. 12).

The arm supports 66, 67 are advantageously configured in two parts. For example, the arm supports 66, 67 comprise an arm support upper part and an arm support lower part. The arm support upper part can in turn likewise be configured in two pieces, consisting of a padding element which has a support surface for supporting the arm of a user, and a housing element which is situated underneath. FIGS. 11 to 15 show by way of example on the arm support 67 that it is configured in two parts, the arm support upper part being held such that it cannot be seen in FIG. 13, for example, with the result that an arm support lower part 72 of the arm support 67 can be seen. The arm supports 66, 67 comprise support surfaces 73, 74. The support services 73, 74 extend along a main plane of extent D.

Figure 12:
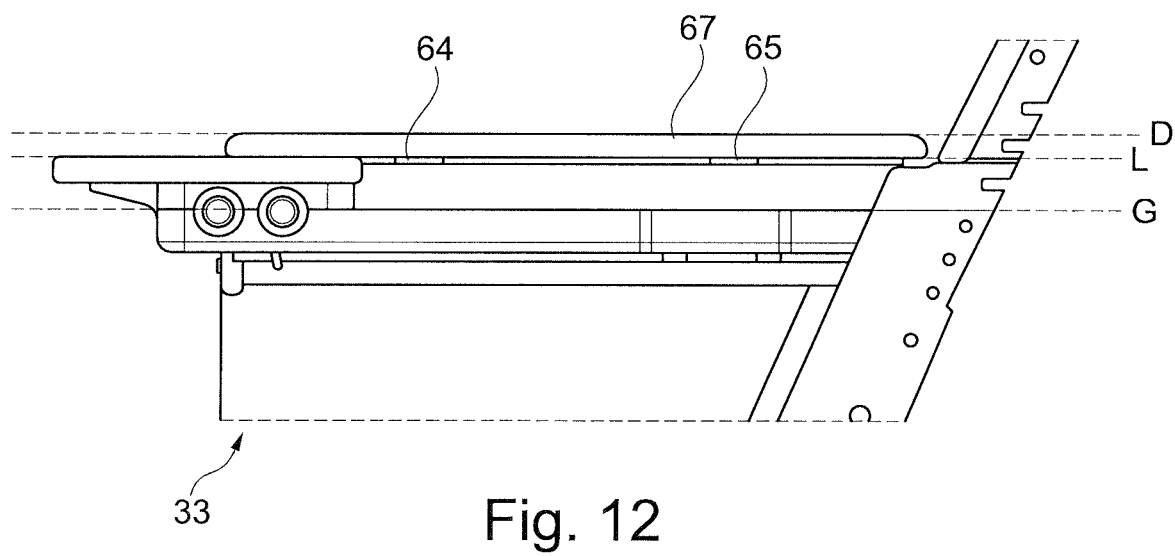
FIG. 12 shows a lateral partial view of the center rest according to FIG. 11.
Figure 13:
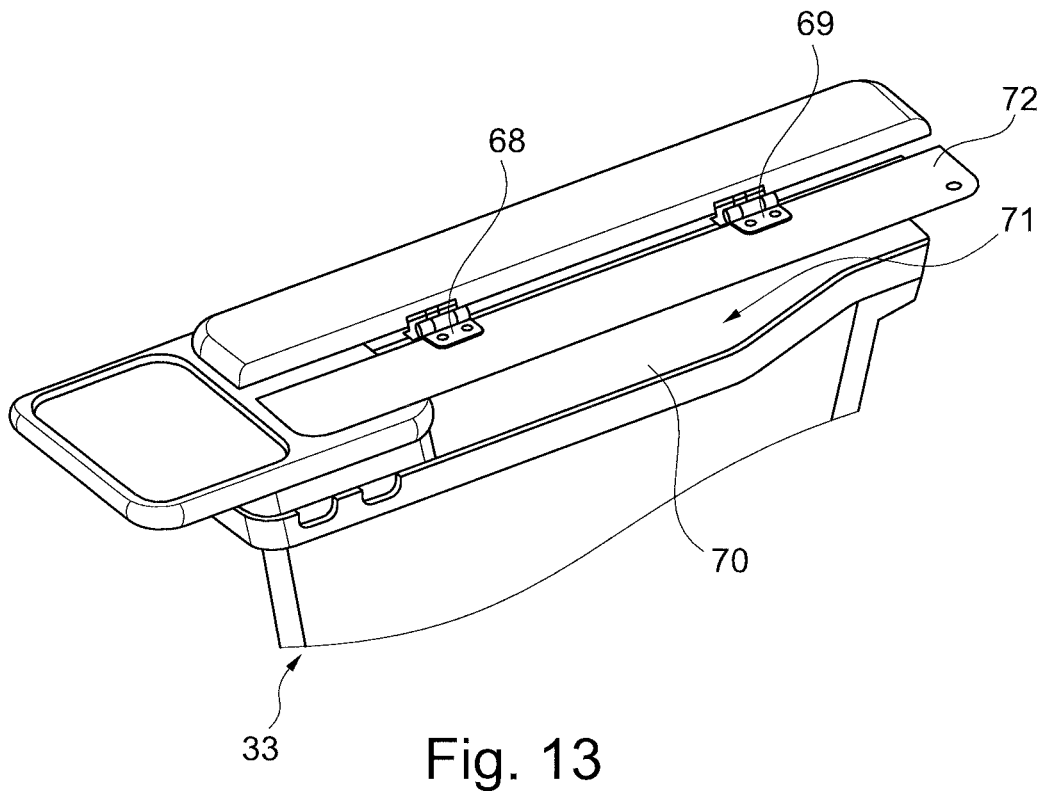
FIG. 13 shows a perspective partial view of the center rest according to FIG. 11, an arm support upper part with a padded element and an armrest of the center rest being held such that they cannot be seen.
Figure 14:
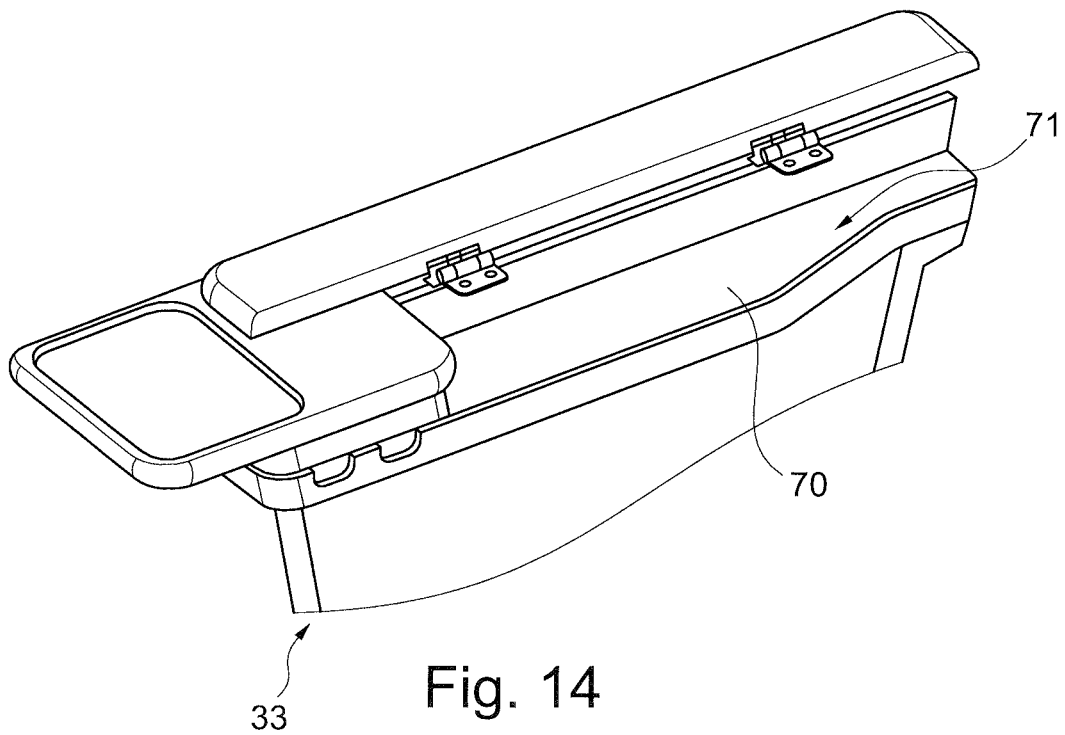
FIG. 14 shows a perspective partial view of the center rest according to FIG. 11, an armrest of the center rest being held such that it cannot be seen.
Figure 18:
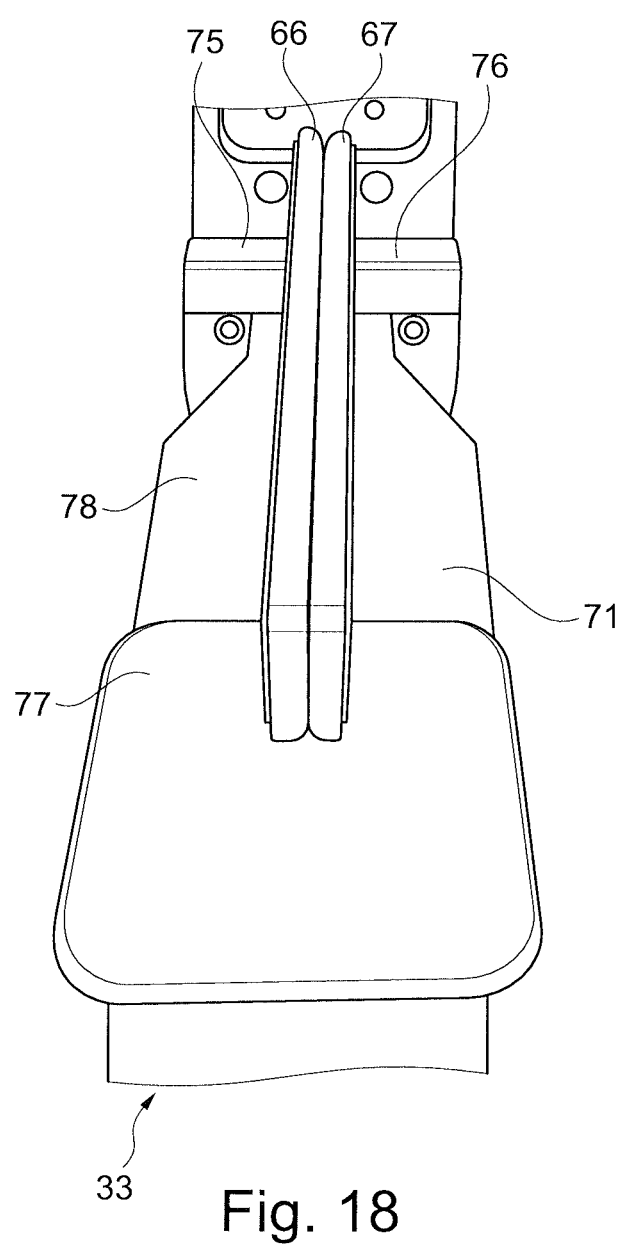
FIG. 18 shows a perspective partial view from the front at the top of a center rest, the two armrests of the center rest being situated in a first position.
Figure 17:
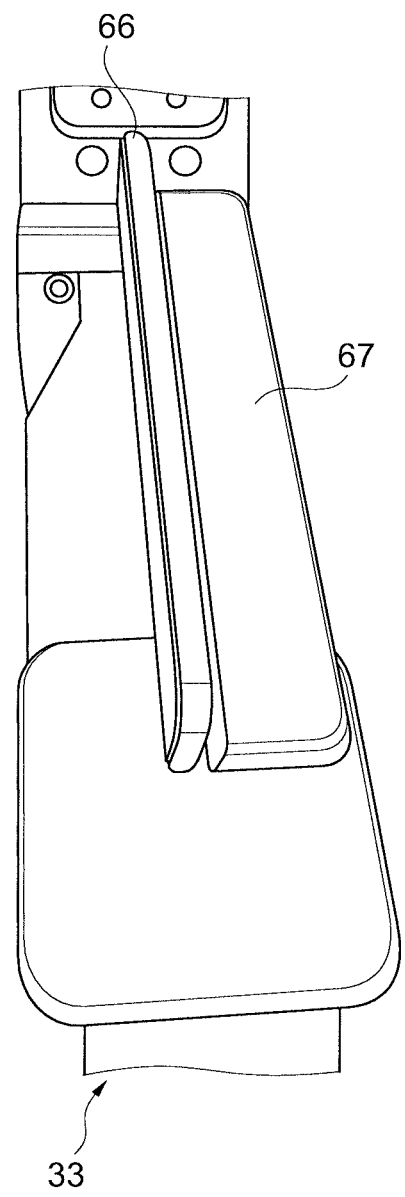
FIG. 17 shows a perspective partial view from the front at the top of a center rest, an arm support being situated in a first position and a further arm support being situated in a second position.

FIGS. 11 and 12 show the arm supports 66, 67 in the second position on the center rest 33. In FIG. 17, the first arm support 66 is situated in a first position, and the second arm support 67 is situated in the second position. In FIG. 18, both the first arm support 66 and the second arm support 67 are situated in the first position. It is shown by way of example in FIG. 18 that the first and the second arm support 66, 67 can be present in the first position such that their support surfaces 73, 74 bear against one another.

The center rest 33 advantageously comprises stop members in the form of limiting members 75-77 which are configured, for example, as a support surface for supporting the arm supports 66, 67 (see also FIG. 18). The arm supports 66, 67 advantageously bear against, in particular, lie on, the limiting members 75-77 in the second position.

LIST OF DESIGNATIONS

1 Seat row
2 Seat direction
3-4 Air passenger seat
5, 9 Seat base
6, 10 Backrest
7, 11 Enclosure
8, 12 Leg support
13 Support leg
14 Cabin floor
15, 19 End region
16, 20 Strut
17, 18 Mounting point
21 Strut element
22, 23 Armrest
24 Center rest
25 Hinge
26 Mounting member
27 Connecting member
28 Center element
29, 30 Leaf element
31, 32 Through bore
33 Center rest
34 Fastening surface
35, 37 Main side
36 Recess
38, 43 Rotary joint
39, 44 Shaft
40-42 Bushing
45-47 Bushing
48-51 Mounting element
52, 53 Contact member
54-57 Stop member
58, 59 Contact element
60-63 Stop element
64, 65 Hinge
66, 67 Arm support
68, 69 Leaf element
70 Panel element
71, 78 Storage surface
72 Armrest lower part
73, 74 Rest surface
75-77 Limiting member

The invention claimed is:

1. A center rest of an air passenger seat row with an arm support and a hinge comprising a center element and two leaf elements, a first leaf element being articulated on the center element such that it can be rotated about a first rotational axis, a second leaf element being articulated on the center element such that it can be rotated about a second rotational axis, the first leaf element having a mounting element, in order to arrange a leaf or a flap, the second leaf element having a further mounting element, in order to arrange a further leaf or a further flap, the hinge having a mounting member, in order to fasten the center element to an air passenger seat, with the result that, in the mounted state of the hinge on the air passenger seat and in the arranged state of the leaves or the flaps, the leaves or the flaps are present such that they can be moved relative to the remaining air passenger seat, the first and the second rotational axis being present on the hinge so as to extend in a bearing plane and so as to be spaced apart from one another, wherein the first leaf element is articulated on the center element by way of a first bushing, the first bushing of the first leaf element being present along the first rotational axis between a second and a third bushing of the center element, the first to third bushing being mounted on a first shaft of the hinge, the second leaf element being articulated on the center element by way of a fourth bushing, the fourth bushing of the first leaf element being present along the second rotational axis between a fifth and a sixth bushing of the center element, the fourth to sixth bushing being mounted on a second shaft of the hinge, wherein the arm support being articulated movably on the hinge, wherein the center rest has a horizontal storage surface which extends in a storage plane, the hinge being arranged in the region of the horizontal storage surface via the mounting member on the center rest, the horizontal storage surface being present in a manner which is spaced apart from and parallel to the bearing plane of the rotational axes.

2. The center rest according to claim 1, wherein the hinge has a connecting member which is present so as to extend in a main extension direction transversely with respect to the bearing plane of the rotational axes, the center element being arranged at a first end of the connecting member, the mounting member being present at a second end of the connecting member which is present in a manner which is spaced apart from and lies opposite the first end of the connecting member.

3. The center rest as claimed in claim 2, wherein the mounting member extends in a plane transversely with respect to the main extension plane of the connecting member, with the result that the mounting member and the connecting member are present in a T-shaped manner.

4. The center rest as claimed in claim 1, wherein the center element has a first and a second stop member, the first leaf element bearing against the first stop member and the second leaf element bearing against the second stop member in a first position of the leaf elements.

5. The center rest as claimed in claim 1, wherein the center element has a first and a second stop element, the first leaf element bearing against the first stop element and the second leaf element bearing against the second stop element in a second position of the leaf elements.

6. The center rest as claimed in claim 1, wherein the center rest has two horizontal storage surfaces which extend in the same storage plane and are present in a manner which is spaced apart from one another.

7. The center rest as claimed in claim 1, wherein the connecting member of the hinge is present in a manner which projects from the storage plane.

8. The center rest as claimed in claim 1, wherein the center rest has two arm supports, the center rest having two stop members, in each case one arm support bearing against in each case one stop member in a first position, each arm support having a support surface, the support surfaces extending in the direction of the bearing plane in the first position.

9. The center rest as claimed in claim 1, wherein the center rest has two arm supports, the two arm supports being present such that they can be moved in each case into a second position, the two arm supports being present so as to bear against one another in the respective second position.

10. An air passenger seat with the center rest as claimed in claim 1.

11. An aircraft with the center rest as claimed in claim 1.

12. An aircraft with the air passenger seat as claimed in claim 10.

* * * * *